INVENTOR.
E. W. HENDERSON
BY
*Young & Quigg*
ATTORNEYS

United States Patent Office 3,592,596
Patented July 13, 1971

3,592,596
METHOD AND APPARATUS FOR THE PRODUCTION OF CARBON BLACK
Eulas W. Henderson, Borger, Tex., assignor to Phillips Petroleum Company
Filed May 23, 1968, Ser. No. 731,524
Int. Cl. C09c 1/50
U.S. Cl. 23—209.4             7 Claims

ABSTRACT OF THE DISCLOSURE

Process and apparatus for the production of carbon black wherein a mixture of hydrocarbon feed and hot combustion gases is expanded in at least one intermediate section of the reactor, the expanded mixture passed into a combustion zone having a diameter greater than the diameter of said intermediate section and contacted therein with additional hot combustion gases, and the resulting mixture passed into a reaction zone wherein the hydrocarbon feed is pyrolytically decomposed into carbon black.

---

This invention pertains to carbon black production. In one of its more specific aspects, this invention pertains to apparatus for the production of carbon black and for a process for producing carbon black which is performed using this apparatus.

Carbon black, which is widely used in rubber production, is required by industrial users in a wide range of product specifications. For various reasons, only a relatively small proportion of carbon blacks for which specifications have been developed can be produced in any one reactor. Accordingly, a continuous effort has been made to develop a reactor which would produce a wide range of carbon black products.

There has now been developed a carbon black process and a carbon black reactor for producing a wider range of carbon black products. According to this invention, there is provided a process for producing carbon black by the pyrolytic decomposition of a carbonaceous material which comprises introducing a carbonaceous feedstock, air and combustible gases into a first zone to form a first reactant mass, expanding the first reactant mass into a second zone, passing the first reactant mass into a third zone, the third zone having a diameter greater than the diameter of the second zone, introducing into the third zone a quantity of combustion gases to form a second reactant mass and passing the second reactant mass into a fourth zone where at least a portion of the carbonaceous material is pyrolytically converted to carbon black.

There has also been invented a reactor for the practice of this invention, this reactor comprising a plurality of axially aligned, contiguous reaction zones adapted for introduction of carbonaceous material, reactant air, and combustible gas into a first zone, a second zone in open communcation with the first zone, the second zone having a diameter greater than the diameter of the first zone, a third zone in open communication with the second zone, the third zone being adapted for the introduction thereinto of combustion gases and having a diameter greater than the diameter of the second zone, a fourth zone in open communciation with the third zone, the fourth zone being adapted for the recovery of carbon black therefrom.

In the preferred embodiment of the apparatus of this invention, there exists a single zone between the zone into which the make-oil is introduced and the combustion zone, this single zone having a substantially constant diameter intermediate the diameters of the preceding and subsequent zones.

In less preferred embodiments, any number of zones may be interposed between the make-oil introduction zone and the combustion zone, each of the zones so interposed being of a substantially constant diameter, intermediate the diameters of the make-oil introduction zone and the combustion zone, each of the interposed zones being of successively greater diameter than the preceding zone with reference to the direction of make-oil flow through the reactor.

Accordingly, it is an object of this invention to provide an improved process for producing carbon black.

It is another object of this invention to provide an improved reactor for producing carbon black.

There are several prior art processes for producing carbon black. In one of these, the hydrocarbon make-oil is introduced into the first or make-oil introduction zone, also known as the axial zone, with at least a portion of the total combustible gases and air also being introduced into this first reaction zone. The make-oil and combustion gas are then conducted into a second, or combustion zone, in which a further quantity of combustion gases is added to the reaction mass, the combustion gases generally being introduced in such a manner as to envelop the make-oil. The entire reaction mass is the conducted into a third, or reaction, zone in which at least a portion of the carbon black is produced and from which zone the carbon black is removed and routed to be separated from the product gases.

Generally, in the prior art processes, the second zone, that is, the combustion zone, is of greater diameter than either the first or the third zone. Any relationship is possible between the diameters of the first and of the third reaction zones.

It has now been discovered that a wider range of carbon black products can be produced if the reactant mass is conducted from the axial zone into at least one zone interposed between the axial and combustion zones and having a diameter intermediate the diameters of the axial zone and the combustion zone. In other words, there is provided at least one zone of intermediate diameter between the axial and the combustion zones in which expansion of the reactant mass from the axial zone takes place prior to the entrance of the reactants into the combustion zone and the commingling of the reactant mass therewith.

It is to be understood that in the process of this invention some portion of the hydrocarbon feed, the free oxygen-containing gas and the combustible gas can be introduced into the combustion zone as well as the axial zone, or into both zones.

In respect to the apparatus, it has been determined that if in the conventional type tri-sectional reactor, at least one zone is interposed between the axial zone and the combustion zone, the interposed zone or zones being of diameter intermediate the axial zone and the combustion zone diameters, carbon black products meeting a wider range of specifications can be produced. Alternately expressed, if a reactor has an axial zone of 12 inches diameter and a combustion zone of 37 inches in diameter, it will be possible to produce a certain number of carbon black products by varying operating conditions, such as, for example, that distance from the upstream edge of the combustion zone to the variably positional make-oil nozzle located within the axial zone. This distance in which the make-oil nozzle can be positioned in the axial zone back from the upstream edge of the combustion section will be referred to herein as the "oil operable range." Accordingly, then, the effect of interposing at least one zone of intermediate diameter between the axial zone and the combustion zone is to create, in effect, what shall be known hereinafter as a "stepped tunnel" by virtue of which the oil operable range of the reactor is increased and accordingly, a larger number of carbon black products can be made within the reactor.

In the operation of conventional carbon black processes with conventional equipment, the oil operable range of the reactor is frequently limited by the premature formation of carbon deposits. This formation of carbon may occur at the make-oil nozzle, thus making the process inoperable or, it may occur at such a point in the reactor that the carbon black formed fails to meet required product specifications. In other words, the oil operable range is generally limited by improper or undesirable carbon deposition within the reactor and, the wider the oil operability range, the larger is the number of individual carbon black products producible in any one process or in any one reactor.

The apparatus of the present invention will be more readily understood by reference to the attached figures illustrating two embodiments of the invention.

Figure 1:
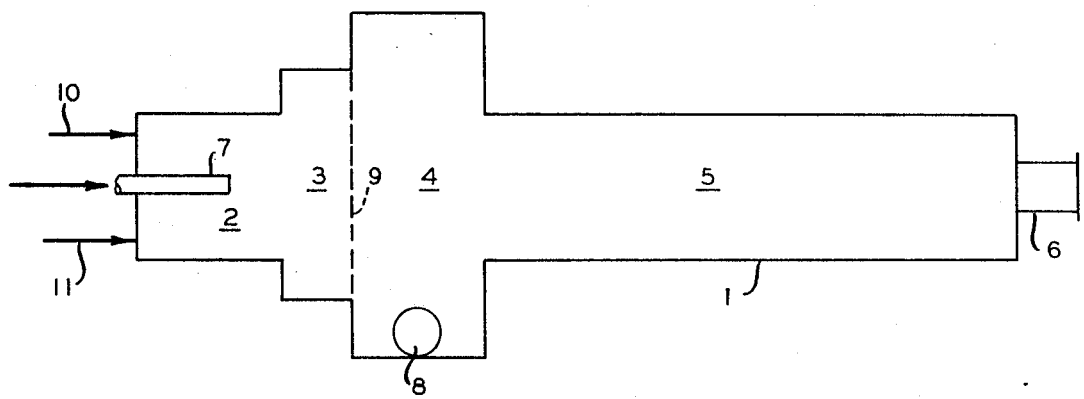
FIG. 1 is an elevation of the preferred embodiment of this invention in which a single interposed zone has been added.

Referring now to FIG. 1, carbon black reactor 1 is indicated in elevation, the exterior shell and insulation not being shown. The reactor has four distinct zones in contiguous, axial alignment. These zones are axial zone 2, the interposed or stepped zone 3, the combustion zone 4 and reaction zone 5. Axial zone 2 is equipped with variable positionable nozzle 7 through which the hydrocarbon make-oil is introduced into axial zone 2. Also communicating with axial zone 2 are conduits 10 and 11 through which a free oxygen-containing gas and combustion gases or combustible gases are introduced. It will be understood that concentrically to nozzle 7, there may be introduced into axial zone 2, air and combustbile gases.

Combustion zone 4 is equipped with combustion gas inlet 8 which, while shown singly, may be provided in any number. Through inlet 8 is introduced combustion gas, produced by the oxidation of a combustible gas such as fuel gas or methane, or other combustible material with a free oxygen-containing gas such as air. Also, through inlet 8 may be introduced air, make-oil or any of the other materials introduced into the reactor. Inasmuch as the quality of carbon black produced is, in part, dependent upon the distance at which the downstream terminal of make-oil nozzle 7 is located from the inlet to combustion zone 4, as indicated by imaginary line 9, the wider the range of operability available by adjustment of nozzle 7, the wider the range of carbon blacks producible.

Reaction zone 5, being that zone in which a principal portion of the carbon black is formed, is equipped with outlet conduit 6 by means of which the carbon black is removed from the reactor.

Stepped zone 3 is positioned between axial zone 2 and combustion zone 4. It will be larger in diameter than axial zone 2 but it will be smaller in diameter than combustion zone 4. While there is no critical dimensional relationship between these zones in respect to their diameters or lengths, it has been found that the interposed zones will generally be between about 2 inches to about 8 inches, generally between about 4 inches to about 6 inches, larger in diameter than the axial zone, although any diameter greater than the diameter of the axial zone and less than the diameter of the combustion zone has been found satisfactory. In respect to their lengths, these stepped zones will vary from about 1 to about 30 inches, generally about 2 to about 20 inches being preferred.

Figure 2:
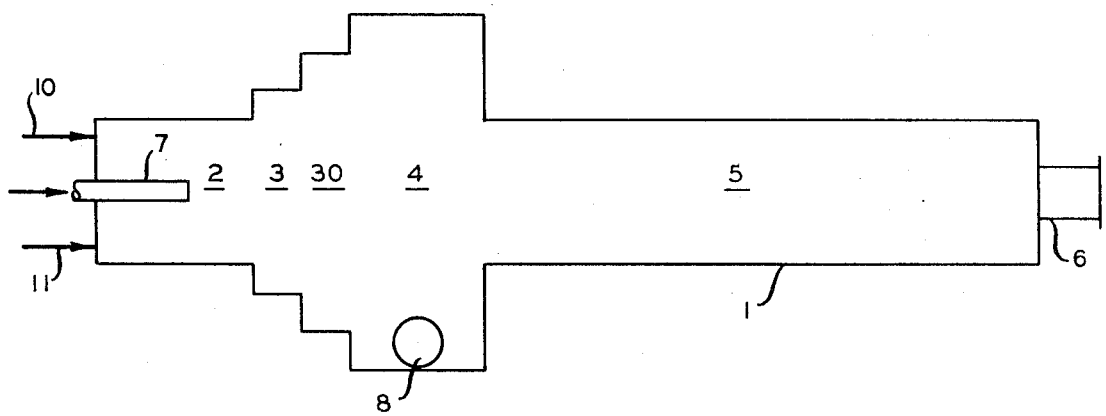
FIG. 2 is an elevation of another embodiment of this invention in which more than one interposed zone has been added.

FIG. 2 indicates another embodiment of this invention, like figures indicating like elements as delineated for FIG. 1. In this instance, however, there are two interposed zones between axial zone 2 and combustion zone 4, these being zones 3 and 30. Again, there is no critical dimensional relationship between these zones in respect to their diameters or lengths, only that each of them be of increasing diameter in reference to the direction of oil flow through the reactor and that each be of a diameter intermediate that of axial zone 2 and combustion zone 4. In respect to their lengths, there are no critical dimensions, individual lentghs from about 1 to about 30 inches being satisfactory.

In the operation of the process of this invention, employing the apparatus just described, make-oil, generally with some portion of air and combustible gas, is introduced axially into zone 2, the reactants proceeding into and through zone 3 and into zone 4 into which combustion gases are injected either radially or tangentially, in the form of an enveloping mass of gases from which heat is transferred to the reactants. The enveloped reactant mass proceeds into zone 5 in which a principal portion of the carbon black is formed and from which the carbon black and gases are removed through conduit 6 to be recovered for further processing.

EXAMPLE I

Three separate carbon black producing operations were conducted, each within a different reactor, but with all employing the identical make-oil or charge stock. Each operation was conducted under substantially comparable conditions by introducing a portion of the air into the axial zone and a portion into the combustion zone. Operations were conducted with reactors of different sizes. One was of the conventional tri-sectional type, and two were of the stepped tunnel type. The tri-sectional type had an axial zone of 12 inches diameter, a combustion zone of 37 inches diameter and a carbon black formation zone or reaction zone of 10 inches diameter. This reactor is indicated as size 12" x 10". The second and third reactors, in which the process of this invention was carried out, had axial zones of 12 inches diameter, a stepped zone of 17 inches diameter, a combustion zone of 37 inches diameter and a reaction zone of 12 inches diameter. These reactors are indicated as size 12"–17" x 12".

All comparable zones other than the stepped zones were of comparable lengths. The stepped zones of 17 inches diameter had lengths of 10 and 20 inches, as indicated in the following data.

|  | Run Number | | |
|---|---|---|---|
|  | 1 | 2 | 3 |
|  | Reactor | | |
|  | 12" x 10" | 12"–17" x 12" | 12"–17" x 12" |
| Type | Tri-sectional | Stepped tunnel | Stepped tunnel |
| Length of stepped zone, in | 0 | 10 | 20 |
| Make-oil, g.p.h | 294 | 297 | 307 |
| Axial air, M s.c.f.h | 45 | 55 | 55 |
| Axial gas, M s.c.f.h | 0 | 2.93 | 2.93 |
| Combustion air, M s.c.f.h | 185 | 245 | 245 |
| Nozzle at—inches | 16 | 14 | 14 |
| Carbon deposition | None | None | None |
| Yield, lbs./gal | 4.0 | 3.9 | 3.9 |
| Conversion, percent C to black |  | 38 | 39 |
| Carbon black tests: |  |  |  |
| Photolometer, percent | 94 | 93 | 96 |
| $N_2$ surface area, m.$^2$/g | 114 | 113 | 110 |
| DBP absorp., cc./100 g | 145 | 159 | 173 |

These data indicate that the process of this invention produces a carbon black having a higher structure than the carbon blacks produced by the other process when processing blacks to comparable photolometer and surface area values. Hence, a wide range of carbon black products can be expected to be produced in the process of the present invention with variation of such other factors such as make-oil nozzle location, air to oil ratios, air to gas ratios, and the like. These data further indicate that products of different quality are produced under substantially comparable operating conditions, depending upon the length of the stepped zone employed in the stepped tunnel reactor.

EXAMPLE II

The effect of certain of the aforementioned variables is indicated in the following data showing three runs in the same stepped reactor. Make-oil nozzle discharge locations within the axial tunnel and combustion air were varied, with the following results:

| | Run Number | | |
|---|---|---|---|
| | 1 | 2 | 3 |
| | Reactor | | |
| | 12″–17″ x 12″ | 12″–17″ x 12″ | 12″–17″ x 12″ |
| Type | Stepped tunnel | Stepped tunnel | Stepped tunnel |
| Length of stepped zone, in | 10 | 10 | 10 |
| Make-oil, g.p.h | 297 | 297 | 297 |
| Axial air, M s.c.f.h | 55 | 55 | 55 |
| Axial gas, M s.c.f.h | 2.9 | 2.9 | 2.9 |
| Combustion air, M s.c.f.h | 245 | 295 | 245 |
| Combustion gas, M s.c.f.h | 16.3 | 19.7 | 16.3 |
| Nozzle at—inches | 14 | 14 | 17 |
| Carbon deposition | None | None | None |
| Yield, lb./gal | 3.9 | 3.4 | 3.8 |
| Conversion, percent C to black | 38 | 32.5 | 37.5 |
| Carbon black tests: | | | |
| Photolometer, percent | 93 | 90 | 95 |
| $N_2$ surface area, m.$^2$/g | 113 | 125 | 113 |
| DBP absorp., cc./100 g | 159 | 154 | 164 |

A comparison of Runs 4 and 5 shows the effect of combustion air rate to increase surface area at comparable photolometer values. A comparison of Runs 4 and 6 shows the variability of make-oil discharge nozzle position and its effect on structure.

EXAMPLE III

In order to illustrate the general operability of reactors of the stepped tunnel type, a series of runs was conducted with a 15″–17″ x 10″ axial reactor. The axial zone was 15 inches in diameter, the stepped zone between the axial zone and the combustion zone was 17 inches in diameter, the combusion zone was 37 inches in diameter and reaction zone was 10 inches in diameter. Runs were made at relatively constant oil rates while varying, in each run, the air rate to the axial and combusion zones and the oil nozzle discharge location.

Results were as follows:

| Run No | 7 | 8 | 9 |
|---|---|---|---|
| Length of stepped zone, in | 3 | 3 | 3 |
| Make-oil, g.p.h | 297 | 294 | 297 |
| Axial air, M. s.c.f.h | 45 | 55 | 65 |
| Axial gas, M s.c.f.h | 3.0 | 3.67 | 4.33 |
| Combustion air, M s.c.f.h | 185 | 175 | 165 |
| Combustion gas, M s.c.f.h | 12.33 | 11.67 | 11.0 |
| Nozzle at—inches | 14 | 16 | 20 |
| Yield, lb./gal | 3.52 | 4.4 | 4.1 |
| Conversion, percent C to black | 40.8 | 45.3 | 33.6 |
| Reactor length, in | 94 | 92 | 93 |
| Carbon black tests: | | | |
| Photolometer, percent | 93 | 92 | 94 |
| $N_2$ surface area, m.$^2$/g | 93 | 87 | 92 |
| DBP absorp., cc./100 g | 142 | 147 | 159 |

These data indicate a wide range of operability for this type of reactor as well as a wide range of characteristics of the carbon black produced in this apparatus, by means of this process.

These data further indicate that even with a stepped zone having a comparatively short length of three inches, the range of operability of the reactor is improved.

EXAMPLE IV

A series of runs was then conducted to illustrate further the effect of the length of the stepped zone, operating conditions and reactors otherwise being comparable. Results were as follows:

| | Run Number | |
|---|---|---|
| | 10 | 11 |
| Reactor | 12″–17″ x 12″ | 12″–17″ x 12″ |
| Length of stepped zone, in | 10 | 20 |
| Make-oil, g.p.h | 297 | 333 |
| Axial air, M s.c.f.h | 55 | 55 |
| Axial gas, M s.c.f.h | 2.93 | 1.93 |
| Combustion air, M s.c.f.h | 245 | 245 |
| Combustion gas, M s.c.f.h | 16.3 | 16.3 |
| Nozzle at—inches | 14 | 14 |
| Yield, lb./gal | 3.9 | 3.9 |
| Conversion, percent C to black | 38 | 40 |
| Reactor length, in | 54 | 65 |
| Carbon black tests: | | |
| Photolometer, percent | 93 | 93 |
| $N_2$ surface area, m.$^2$/g | 113 | 99.4 |
| DBP absorp., cc./100 g | 159 | 173 |

These data indicate that a considerable variation in product quality, as reflected in surface area and structure, can be effected when producing blacks of the same photolometer value, by variation of the length of the stepped zone of the stepped tunnel.

The above process has been described in respect to certain specific aspects of the invention, including a specific type of reactor and a specific number of stepped zones in the stepped tunnel. However, such description is not intended to limit the invention thereto. For example, the process of this invention can be performed with any distribution of reactants between axial and combustion zone entry. Similarly, the apparatus is not limited to an axial stepped tunnel having a single stepped zone, but a multiplicity of stepped zones may be employed. Similarly, the invention is not meant to be limited to stepped tunnels having stepped zones of any particular length, or of equal lengths. Other modifications of a similar nature are also within the scope of this invention.

What is claimed is:

1. A process for the production of carbon black by the pyrolytic decomposition of a hydrocarbon feed which comprises:
   (a) introducing a hydrocarbon feed, a free oxygen-containing gas and a fuel into a first reaction zone, and oxidizing said fuel to produce hot combustion gases and to form a first reactant mass comprising said feed and hot combustion gases;
   (b) conducting said first reactant mass successively into at least one intermediate zone having a diameter greater than the diameter of said first reaction zone to expand said first reactant mass;
   (c) conducting said first reactant mass from said intermediate zone successively into a combustion zone having a diameter greater than the diameter of said intermediate zone wherein said first reactant mass is further expanded;
   (d) introducing through the periphery of said combustion zone and into commingled relationship with said first reactant mass at least one of hydrocarbon feed, free oxygen-containing gas and hot combustion gases formed by the oxidation of a fuel to form a second reactant mass; and,
   (e) passing said second reactant mass into a carbon black formation zone under carbon black forming conditions to form carbon black by the pyrolytic decomposition of said hydrocarbon feed in contact with said hot combustion gases.

2. The process as defined in claim 1 in which said first reactant mass is successively conducted into a plurality of intermediate zones each of said zones having a greater diameter than the next preceding zone to successively expand said first reactant mass.

3. The process as defined in claim 1 in which hot combustion gases are introduced through the periphery of said combustion zone.

4. A carbon black reactor comprising:
(a) an axial having a substantially constant diameter and adapted with conduit means for the introduction of hydrocarbon feed, a free oxygen-containing gas and fuel;
(b) an interposed section of substantially uniform diameter in axial communication with said axial section, said interposed section having a diameter greater than the diameter of said first axial section;
(c) a combustion section in axially successive communication with said interposed section, said combustion section having a diameter greater than the diameter of said interposed section, said combustion section being adapted with conduit means communicating through its outer periphery for the introduction of at least one of hydrocarbon feed, a free oxygen-containing gas and hot combustion gases; and,
(d) a reaction section in axially successive communication with said combustion section, said reaction section having a diameter less than the diameter of said combustion section and adapted with outlet means for the discharge of carbon black.

5. The carbon black reactor as defined in claim 4 in which a plurality of interposed sections are positioned between said axial section and said combustion section, each of said interposed sections having a substantially uniform diameter greater than the diameter of the next preceding interposed section, said interposed sections having a diameter from about 2 to about 8 inches greater than the diameter of said axial section.

6. The carbon black reactor as defined in claim 5 in which said interposed sections are from about 1 to about 30 inches in length.

7. The carbon black reactor as defined in claim 6 in which said conduit means for the introduction of hydrocarbon feed into said axial section is slidably positionable to adjust the locus of introduction of said hydrocarbon feed into said axial section.

References Cited
UNITED STATES PATENTS

| | | | |
|---|---|---|---|
| 2,934,410 | 4/1960 | Smith | 23—277 |
| 3,256,065 | 6/1966 | Latham | 23—259.5 |
| 3,355,247 | 11/1967 | Krejci | 23—209.4 |
| 3,375,075 | 3/1968 | Ruble | 23—209.4 |
| 3,420,632 | 1/1969 | Ryan | 23—209.4 |

EDWARD J. MEROS, Primary Examiner

U.S. Cl. X.R.

23—259.5